(12) United States Patent
Hill

(10) Patent No.: US 9,738,232 B1
(45) Date of Patent: Aug. 22, 2017

(54) CONTAINER SYSTEM AND MOUNT

(71) Applicant: SUV SWING VAULT, LLC, Nashville, TN (US)

(72) Inventor: Matthew Hill, Nashville, TN (US)

(73) Assignee: SUV Swing Vault, LLC, Nashville, TN (US)

( * ) Notice: Subject to any disclaimer, the term of this patent is extended or adjusted under 35 U.S.C. 154(b) by 302 days.

(21) Appl. No.: 14/505,198

(22) Filed: Oct. 2, 2014

(51) Int. Cl.
  *B60R 11/00* (2006.01)
  *B60R 7/00* (2006.01)
  *F16M 13/02* (2006.01)

(52) U.S. Cl.
  CPC ........... *B60R 11/00* (2013.01); *B60R 7/00* (2013.01); *F16M 13/022* (2013.01); *B60R 2011/0036* (2013.01); *B60R 2011/0085* (2013.01)

(58) Field of Classification Search
  CPC ..... B60R 2011/0036; B60R 2011/0085; B60R 7/02; B60R 9/065; B60R 11/00; B60R 7/00; F16M 13/022
  USPC .......................... 224/496, 542, 553, 509, 282
  See application file for complete search history.

(56) References Cited

U.S. PATENT DOCUMENTS

| | | | | | |
|---|---|---|---|---|---|
| 4,192,039 | A | * | 3/1980 | Haberle | B60J 5/101 16/86 B |
| 5,186,371 | A | * | 2/1993 | Jozefczak | B62D 43/02 224/42.21 |
| 5,842,615 | A | * | 12/1998 | Goodness | B60R 9/06 224/485 |
| 5,988,534 | A | * | 11/1999 | Kost | E01C 19/203 239/650 |
| 7,309,093 | B2 | * | 12/2007 | Ward | B60R 9/00 206/349 |
| 9,352,698 | B2 | * | 5/2016 | Romanelli | B60R 9/06 |
| 2003/0189353 | A1 | * | 10/2003 | Moore | B60R 11/06 296/37.6 |
| 2007/0152003 | A1 | * | 7/2007 | Dollar | B60R 11/00 224/404 |

* cited by examiner

*Primary Examiner* — Corey Skurdal
(74) *Attorney, Agent, or Firm* — Waller Lansden Dortch & Davis, LLP; Mark A. Pitchford

(57) ABSTRACT

A container and mounting bracket system configured to be mounted to and secured in a vehicle. The container and mounting bracket system extend laterally with respect to the vehicle at a rear of the vehicle when mounted in and secured in the vehicle. The mounting bracket system and container system cooperate to allow the container system to rotate about a spindle at one end of the mounting bracket system such that the container system extends out the back of the vehicle, allowing access to a cargo area of the vehicle.

15 Claims, 12 Drawing Sheets

CONTAINER SYSTEM AND MOUNT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to movable container systems. More particularly, this invention pertains to pivoting or swinging containers and mounting systems.

A container can organize and protect the goods for storage and transport. Containers that are not secured in a vehicle can be dangerous to occupants and do not adequately protect the goods stored therein. Automobiles (e.g., SUVs) are relatively easy to burglarize, and lock boxes are sometimes secured within a vehicle to provide additional theft protection for valuable and/or dangerous items (e.g., guns) frequently stored in the vehicle. In sport utility vehicles (SUVs), the only surface common to most models is a floor of a cargo area. When a container is secured to the floor of the cargo area of an SUV, it is either against the rear seats, along the side, or at the rear of the vehicle (just inside a gate or rear hatch). If the container is secured against the rear seats, then the container is difficult to access from the rear of the vehicle. If the container is secured along the side of the cargo area, then only part of the container is accessible from the rear of the vehicle while the other part is accessible from the rear seat, but the entire cargo area remains accessible from the rear of the vehicle. If the container is secured at the rear of the vehicle, then the container is easily accessed but accessing the cargo area between the container and the rear seat becomes difficult. These problems are particularly pronounced when using containers suitable for storing longer items (e.g., golf clubs and long guns such as rifles and shotguns). For longer containers secured toward a front of the cargo area (behind the second row seats) or longitudinally on one side of the cargo area, third row seats in SUVs become inoperable. Further, longer containers mounted at the side of the cargo area may have locks or retainers at either end requiring a user to release the lock from the rear seat then go to the back of the vehicle to release the other lock before opening the container. With a central lock the user must climb into the cargo area to release the lock. Therefore, containers which are easily moved between at least a couple of positions, yet easily secured for travel are desirable. These same principles apply to truck beds. However, truck beds have a floor and a bed rail, both of which are in a generally standard location and of a generally standard size. Unlike a truck bed, the cargo areas of SUVs provide no bed railing directly over the floor area to which a container system may be secured for selectively pivoting or rotating rearward, allowing access to the cargo area between the container system and the rear seat (i.e., between the container system and the bulkhead for a truck). As a result, no suitable standard anchoring surface exists for attaching a pivoting container system in SUVs.

What is needed, then, is container and mount system which can easily and securely store various goods within a vehicle such as an SUV without reducing a user's access to those goods or to the cargo area of the vehicle.

BRIEF SUMMARY OF THE INVENTION

Aspects of the present invention provide a container and mounting bracket system configured to be mounted to and secured in a vehicle. The container and mounting bracket system extend laterally with respect to the vehicle at a rear of the vehicle when mounted in and secured in the vehicle. The mounting bracket system and container system cooperate to allow the container system to rotate about a spindle at one end of the mounting bracket system such that the container system can extends out beyond the back or rear of the vehicle, allowing access to a cargo area of the vehicle.

In one aspect of the invention, a container system includes a mounting bracket, a spindle, and a container. The mounting bracket includes a first portion and a second portion. The first portion is configured to mount to a floor surface of a vehicle with the first portion extending longitudinally with respect to the vehicle. The first portion is at a proximal end of the mounting bracket. The second portion is configured to mount to the floor surface of the vehicle. The second portion is at a distal end of the mounting bracket. The spindle is configured to extend vertically from the first portion of the mounting bracket. The spindle has a base end configured to attach to the mounting bracket and a free end opposite the base end. The container is configured to pivotally attach to the spindle such that a distal end of the container extends substantially to the distal end of the mounting bracket when the container system is mounted to and secured in the vehicle. The container system may further include a shoulder stop extending vertically from at least a portion of the second portion of the mounting bracket. The shoulder stop is configured to prevent the container from rotating toward a front of the vehicle beyond a predetermined position when the container system is mounted to the vehicle.

In another aspect of the invention, a container is configured to pivotally attach to a vehicle via a mounting bracket of a container system. The container includes a first side, a second side, a front surface, a rear surface, and a pivot mount at a joint between the first side and rear surface. The first side is configured to be positioned at a proximal end of the mounting bracket when the mounting bracket is mounted to the vehicle and the container is secured in the vehicle and the container is secured in the vehicle to the mounting bracket. The second side is opposite the first side of the container and is positioned at a distal end of the mounting bracket when the mounting bracket is mounted to the vehicle and the container is secured in the vehicle to the mounting bracket. The front surface faces a front of the vehicle when the mounting bracket is mounted to the vehicle and the container is secured in the vehicle to the mounting bracket. The front surface is configured to engage a shoulder stop of the mounting bracket when the mounting bracket is mounted to the vehicle and the container is secured in the vehicle to the mounting bracket. The shoulder stop prevents the container from rotating toward a front of the vehicle beyond a predetermined position. The rear surface faces a rear of the vehicle when the mounting bracket is mounted to the vehicle and the container is secured in the vehicle to the mounting bracket.

In another aspect of the invention, a mounting bracket system is provided which is configured to support a container of a container system. The mounting bracket system includes a mounting bracket, a spindle, and a shoulder stop. The mounting bracket has a first portion and a second portion. The first portion is configured to mount to a floor surface of a vehicle. The first portion extends longitudinally with respect to the vehicle. The first portion is at (e.g., forms) a proximal end of the mounting bracket. The second portion is configured to mount to the floor surface of the vehicle at a distal end of the mounting bracket. The spindle is configured to extend vertically from the first portion of the mounting bracket. The spindle has a base end configured to attach to the mounting bracket and a free end opposite the base end. The shoulder stop extends vertically from at least a portion of the second portion of the mounting bracket. The shoulder stop is configured to prevent the container from rotating toward a front of the vehicle beyond a predetermined position when the mounting bracket system and container system are mounted to the vehicle.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
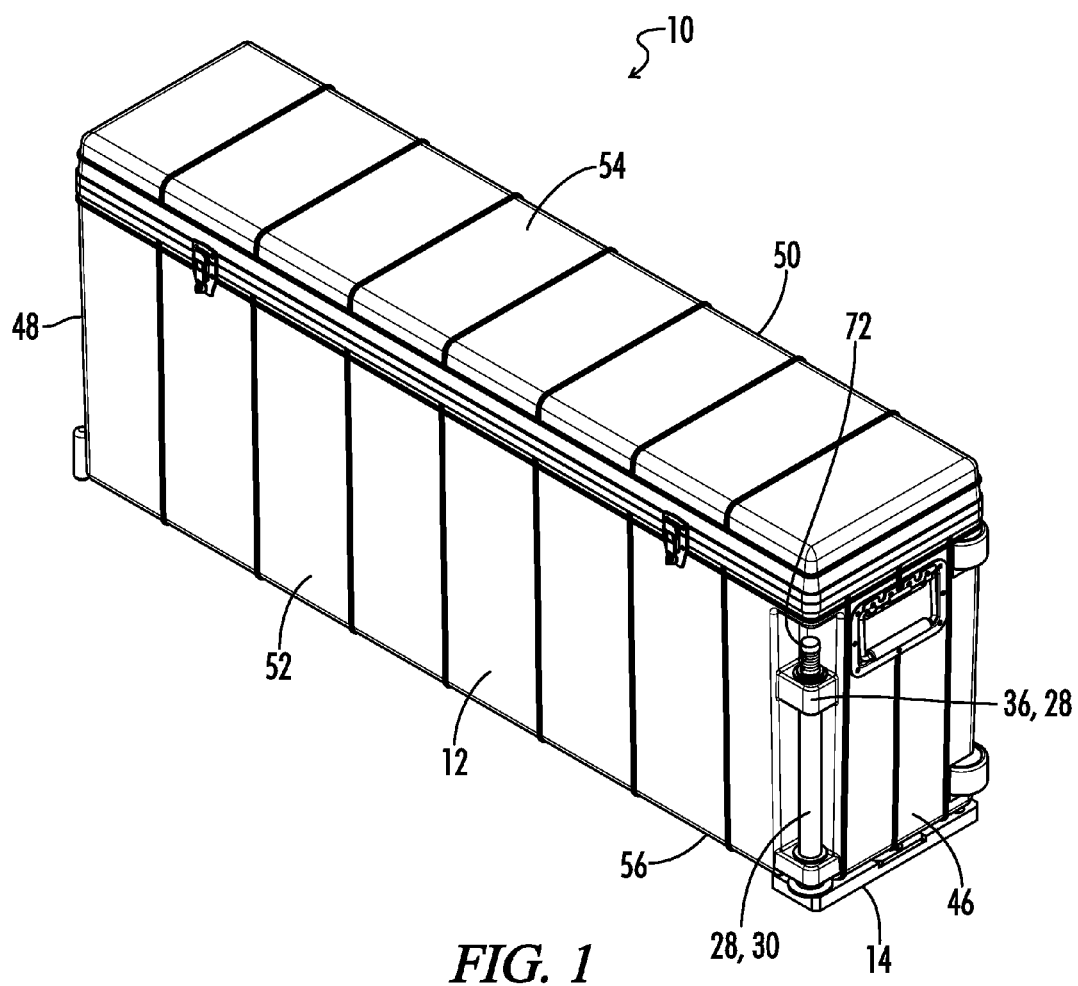
FIG. 1 is a rear isometric view of one container system embodiment.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above," "below," "over," and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring now to FIGS. 1-9, a container system 10 includes a container 12 and mounting bracket system 13. The mounting bracket system 13 includes a mounting bracket 14 and spindle 16. The container system 10 is configured to mount in a vehicle, and specifically, on a vehicle floor. The container system 10 (e.g., the mounting bracket system 13) is configured to mount in a vehicle such that at least a portion of the container system 10 (i.e., the container 12) is enclosed by the vehicle's cabin or cargo area. At least a portion of the container system 10 (e.g., the mounting bracket system 13) is fixed or attached to a floor surface of the vehicle when the container system 10 is properly mounted in the vehicle. When the container 12 is mounted in the vehicle, the container 12 is pivotally attached to the spindle 16 of the mounting bracket system 13, and the spindle 16 defines an axis of rotation for the container 12.

Figure 3A:
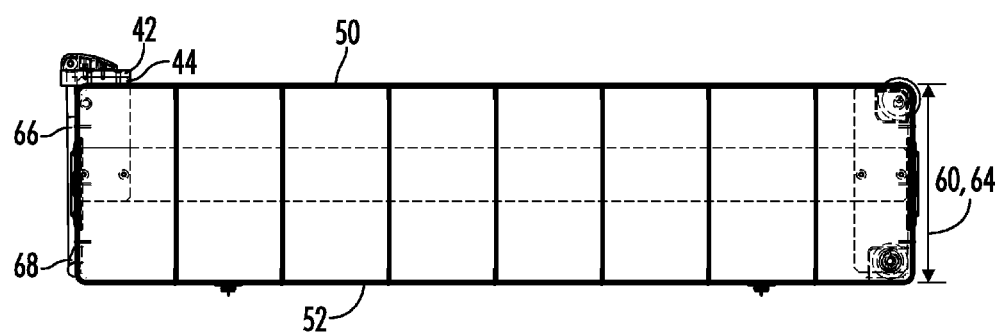
FIG. 3A is a top view of the container system of FIG. 1 in a secured position.
Figure 3B:
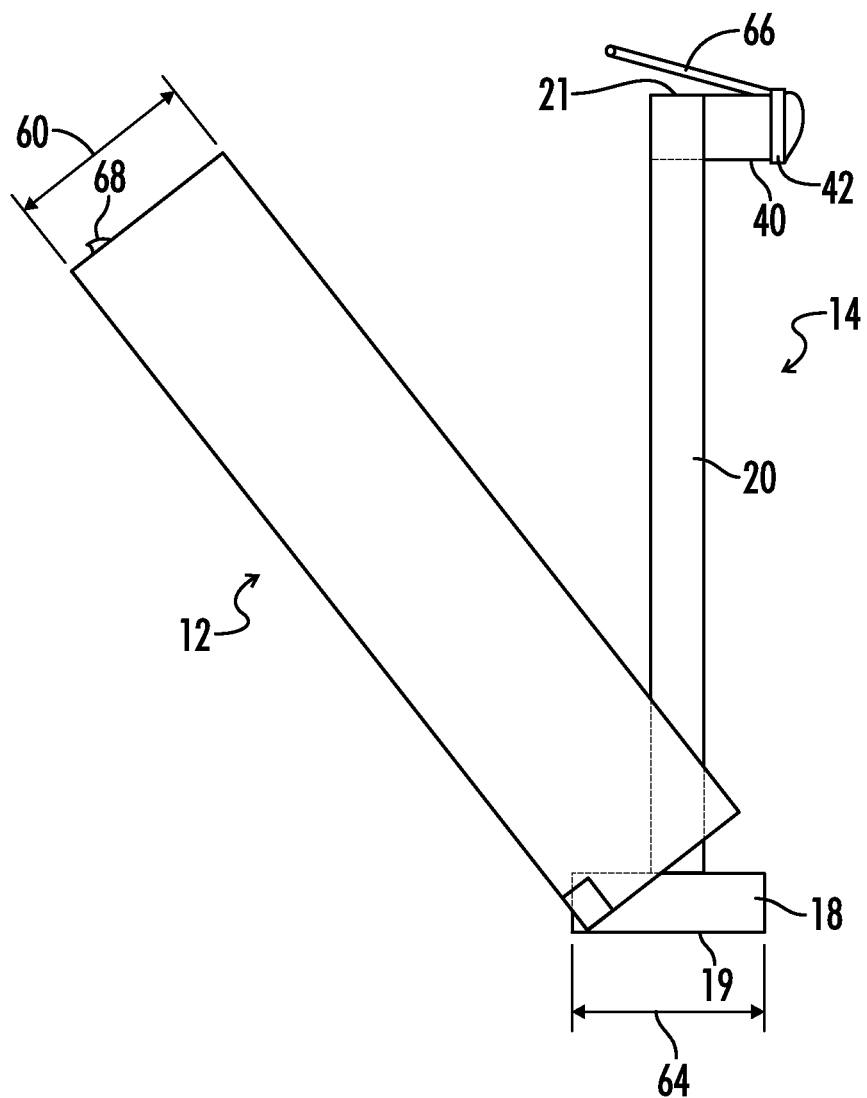
FIG. 3B is a top view of the container system of FIG. 1 in an open or unsecured position.
Figure 4:
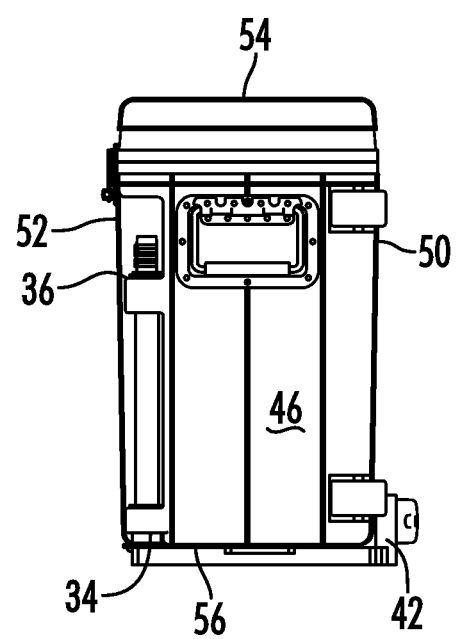
FIG. 4 is a proximal side view of the container system of FIG. 1.

As shown in FIGS. 3A and 3B, when the container system 10 is mounted in the vehicle, the container 12 has a secured position and an open position. FIG. 3A shows an exemplary secured position. When secured, the container 12 is mounted on the spindle 16 and pivotally fixed with respect to the mounting bracket 14 and spindle 16. Substantial pivotal rotation of the container 12 is prevented in the secured position. The container extends laterally (i.e., side to side instead of front to back) with respect to the vehicle in the secured position. FIG. 3B shows an exemplary open or unsecured position. The system 10 is considered open at any non-secured position wherein the container 12 is attached to the spindle. In one embodiment, the container 12 is configured to rotate to a fully open position in which the container lies at an angle between approximately 80° and 180° with respect to a longitudinal axis of the vehicle.

Figure 5:
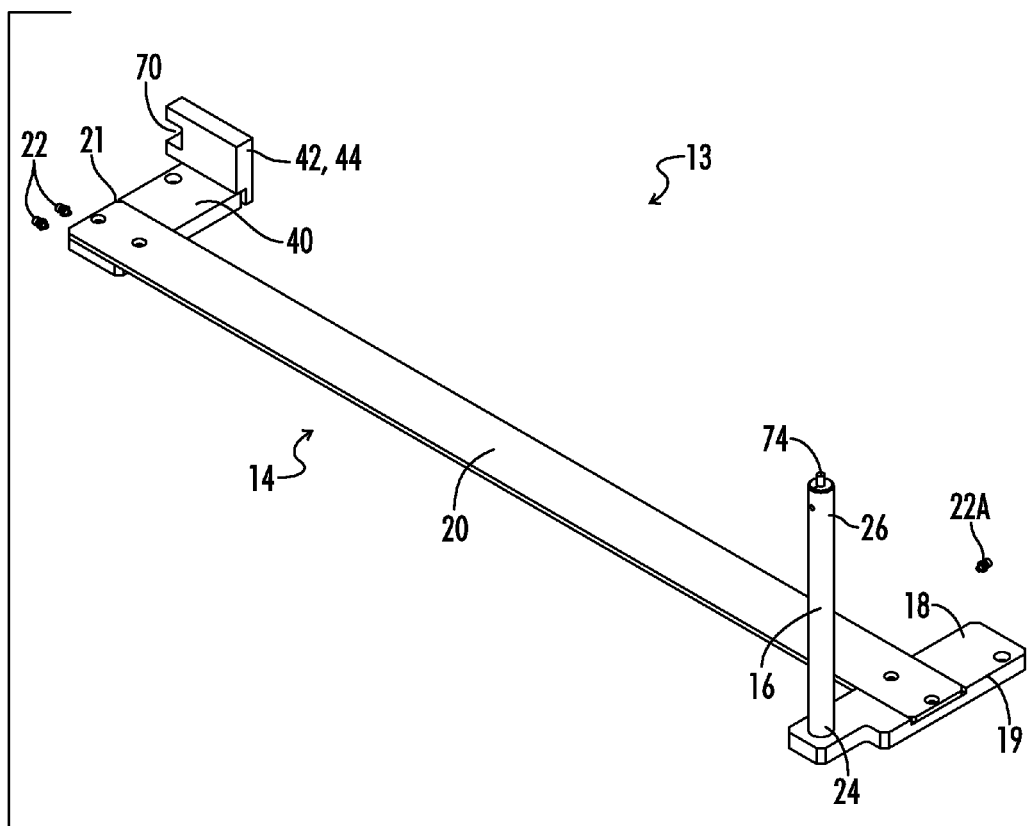
FIG. 5 is an isometric view of one embodiment of a mounting bracket system.

Referring to FIGS. 3A, 3B, and 5, one embodiment of the mounting bracket 14 includes a first portion 18 and a second portion 20. The first portion 18 is configured to mount to a floor surface of the vehicle's cargo area. When properly mounted (i.e., attached) to the floor surface, the first portion 18 extends generally longitudinally along the length of the vehicle (i.e., front to back) at a proximal end of the mounting bracket 14.

The second portion 20 of the mounting bracket 14 also mounts (i.e., attaches) to the floor surface of the cargo area of the vehicle. When properly mounted (e.g., attached to the floor surface), the second portion 20 extends laterally from the first portion 18 of the mounting bracket 14 to a distal end of the mounting bracket 14. That is, the second portion 20 of the mounting bracket 14 extends along the width of the vehicle.

In one embodiment of the mounting bracket 14, the first portion 18 and second portion 20 of the mounting bracket 14 are an integral unit. In another embodiment, the first portion 18 and second portion 20 are discrete components that are selectively attachable to one another (e.g., bolted together).

In one embodiment, the second portion 20 of the mounting bracket 14 includes a wedge 40 (see FIGS. 8A and 8B) which extends from a top surface of the second portion of the mounting bracket 14. In one embodiment, the wedge 40 is located at the distal end 21 of the mounting bracket 14. When the mounting bracket 14 is mounted in the vehicle, the wedge 40 extends longitudinally with respect to the vehicle. As a result, the wedge 40 defines a progressive vertical incline which extends upward from the top surface of the second portion 20 of the mounting bracket 14 and is inclined upward with respect to the front of the vehicle. When the container 12 is in the secured position, the wedge 40 directly engages a bottom surface 56 of the container 12. The wedge 40 supplies a supporting vertical force beneath the container 12 to substantially support a distal end of the container 12 thereby relieving a portion of the moment acting upon the spindle 16 upon which the container 12 is mounted. The wedge 40 may also supply a frictional rotational force 12 which helps maintain the container 12 in the secured position. Optionally, the wedge 40 may include a deformable material which compressively deforms when contacted by the container bottom surface 38. The deformable material may include a rubber, foam, plastic, or any other deformable material known to those of ordinary skill in the art.

Referring to FIG. 5, one embodiment of the mounting bracket system 13 includes a shoulder stop 42. The shoulder stop 42 extends vertically from the second portion 20 of the mounting bracket 14 and prevents the container 12 from rotating toward a front of the vehicle beyond a predetermined position (i.e., the position of the shoulder stop 42). When the container 12 is in the secured position, the shoulder stop 42 remains engaged with the container 12 to ensure that the container 12 remains in a pivotally fixed position.

In one embodiment, the shoulder stop 42 is attached to the mounting bracket second portion 20. A resilient bumper plate 44 may be included on a portion of the shoulder stop which faces the rear of the vehicle when the mounting bracket 14 is properly mounted in the vehicle. The resilient bumper plate 44 remains engaged with the container front surface 50 when the container 12 is in the secured position. The bumper plate 44 may include a resilient or deformable material which is configured to substantially dampen vibrations transferred to and from the container 12. In such embodiments, noise generated by container vibrations may be significant reduced. Moreover, damage to the container 12 and the goods contained therein can be reduced, especially during operation of the vehicle.

In one embodiment, the shoulder stop 42 defines a notch 70. A latch 68 is partially, selectively disposed in the notch 70 and extends towards a catch 68 at a distal face of the container 12. Advantageously, the notch 70 helps maintain the position of the latch 66 when the container 12 is mounted in the vehicle and in the secured position. The latch 66 is provided to maintain the container 12 in the secured position by interaction with the catch 68. As shown in FIG. 3A, in one embodiment, the latch 66 is fixedly disposed on a front-facing portion of the shoulder stop 42, and configured to selectively engage the catch 68 disposed at (e.g., on) the container second side 48 (i.e., a distal side of the container 12). As a result, when the latch 66 engages the catch of the container, the container 12 is secured to the mounting bracket 14 at the distal end of the container 12 and prevented from rotating about the spindle 16 towards the rear of the vehicle. In one embodiment, the latch 66 includes a flexible strap formed from rubber, nylon, or any suitable material known to those of ordinary skill in the art. In other embodiments, the latch 66 may be a rigid bar. As seen in FIGS. 3A and 3B, in one embodiment, the catch 68 extends from the second side 48 of the container 12. The catch 68 may be formed as an integral extension, or may be selectively fastened to the second side 48 of the container 12. Optionally, the catch 68 may include a hook or post to receive the latch 66. In other embodiments, the catch is defined as a recess within the second side 48 configured to receive a portion of the latch 66.

The mounting bracket 14 may be secured at the proximal end 19 and the distal end 21 by one or more fasteners 22. At the proximal end 19, a first fastener 22A may be configured to attach the first portion 18 of the mounting bracket 14 to the vehicle floor surface to prevent substantial horizontal movement or significant deflection of the spindle 16 when the container 12 is mounted in the vehicle and in an open position. In one embodiment, when the container system 10 is properly mounted to the vehicle floor, a depth of the first portion 18 of the mounting bracket 14, measured with respect to the longitudinal axis of the vehicle, is substantially the same as a depth of the container 12, also measured with respect to the longitudinal axis of the vehicle. When properly mounted to the vehicle, the first fastener 22A serves as a counter-balancing anchor to allow the container 12 to rotate to a fully open position (e.g., generally longitudinal with respect to the vehicle) without tipping the mounting bracket 14. Illustratively, screws may be used as fasteners to secure the mounting bracket 14 to the vehicle floor surface. Additionally, or in the alternative, bolts, nuts, adhesives, weld beads, or any other suitable attachment means known to those of ordinary skill in the art may be used as fasteners.

Figure 7:
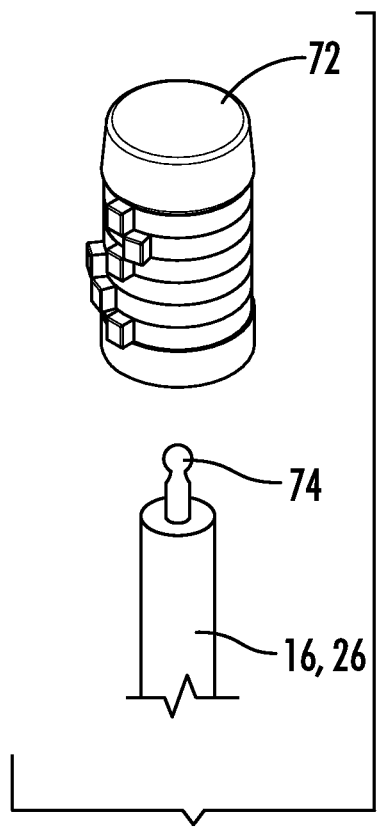
FIG. 7 is a partially exploded isometric view of a vertical lock and spindle of a container system.
Figure 8A:
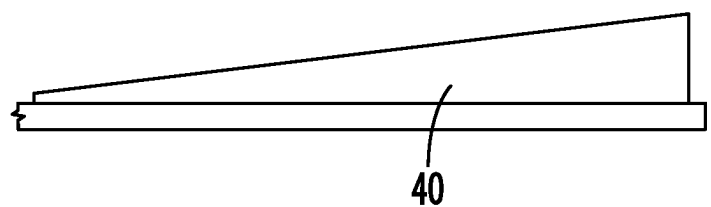
FIG. 8A is a perspective side view of a wedge configured to engage a bottom surface of a container.
Figure 8B:
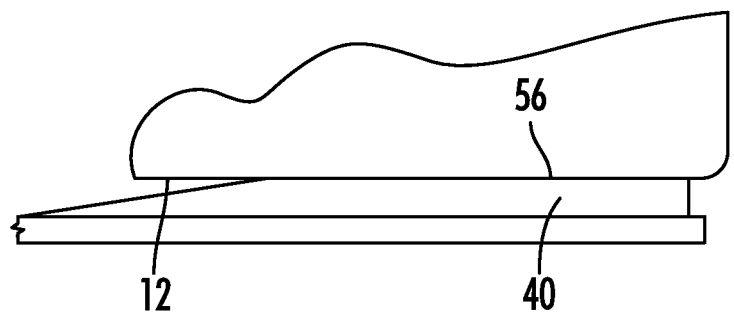
FIG. 8B is a perspective side view of a deformable wedge engaging a bottom surface of a container.

As shown in FIG. 5, the spindle 16 attaches to the mounting bracket 14 at the proximal end 19. A base end 24 of the spindle 16 attaches to the first portion 18 of the mounting bracket 14, while a free end 26 extends vertically upward therefrom, independent of any other mount or securing surface. That is, the spindle 16 is not attached to any other surface of the vehicle or container system 10 that would provide the spindle 16 with vertical stability or support. The spindle 16 has a spindle diameter 78. A lock post 74 is disposed at the free end 26, as shown at FIG. 7. A portion of the lock post 74 has a diameter less than the spindle diameter 78.

Figure 2:
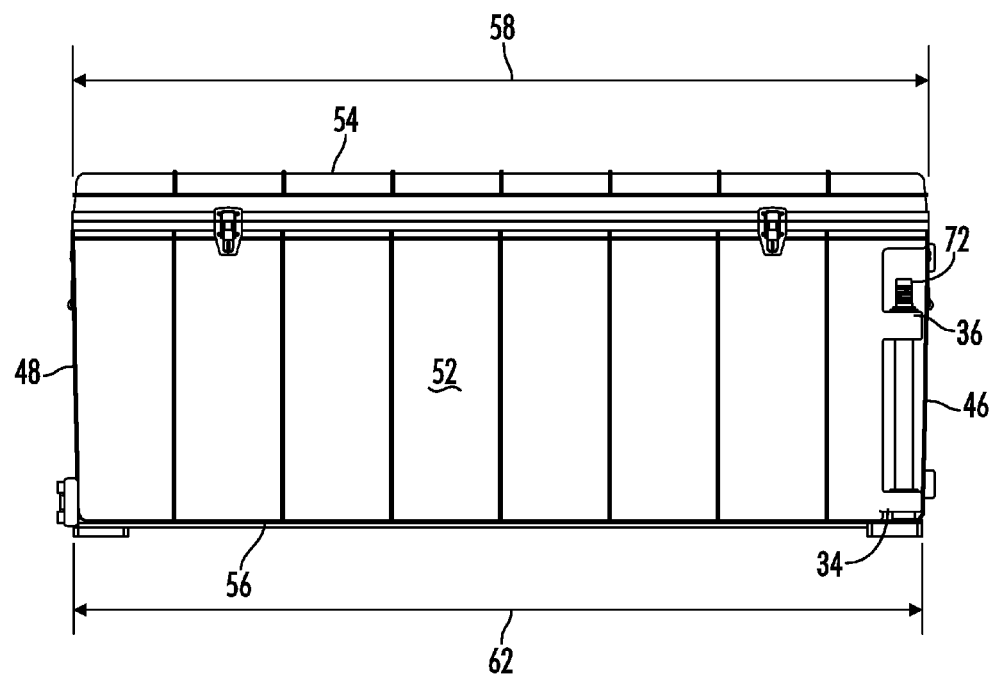
FIG. 2 is a rear view of the container system of FIG. 1.
Figure 9:
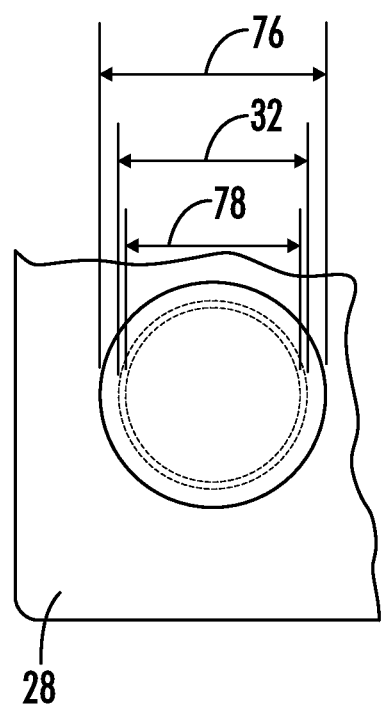
FIG. 9 is an overhead plan view of a pivot mount of a container.

Referring to FIGS. 1 and 2, the container 12 is selectively pivotally attached to the spindle 16. Some embodiments of the container 12 includes a pivot mount 28 positioned at the joining corner or joint between the first side 46 and the rear face 52 of the container 12. The pivot mount 38 includes a sleeve 30. The sleeve 30 defines a passageway having an inner diameter 32, as shown in FIG. 9. The inner diameter 32 of the sleeve may be configured to be substantially equal to or greater than the spindle diameter 78. As a result, fluid rotation of the container 12 is permitted. The sleeve 30 has a bottom end 34 and top end 36. When mounted, the bottom end 34 faces the vehicle floor while the top end 36 is disposed opposite the bottom end 34 and faces a top area of the vehicle. Optionally, one or more bearings may be disposed in the sleeve 30 in order to reduce rotational friction between the sleeve 30 and spindle 16. In one embodiment, a bearing ring engages the sleeve 30 and spindle 16 simultaneously, and the bearing ring forms the passageway of the sleeve 30 that engages the spindle 16.

Figure 6:
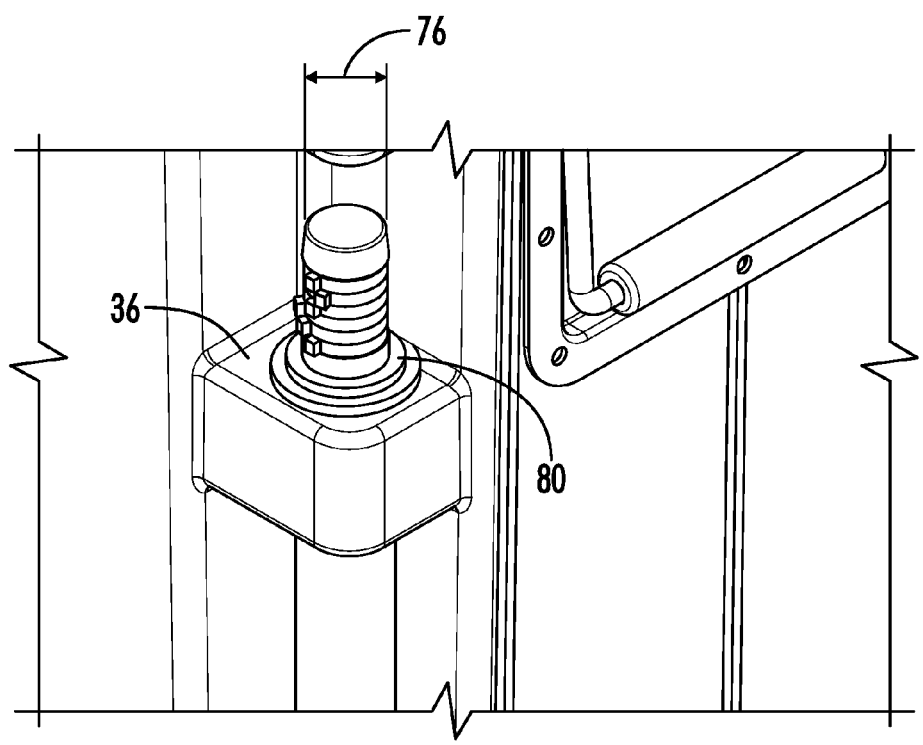
FIG. 6 is a perspective view of a pivot mount of the container system of FIG. 1.

Turning to FIGS. 6 and 7, certain embodiments also include a vertical lock 72. The vertical lock 72 is selectively disposed on the free end 26 of the spindle 16 over the lock post 74. The vertical lock 72 has an outer lock diameter 76 configured to be greater than the spindle diameter 78 and the diameter 32 of a pivot mount passageway of the container. A lock interface 80 at the top end of the container sleeve 30 engages the vertical lock 72. When the vertical lock 72 is placed on the spindle 16, the larger diameter of the vertical lock 76 prevents substantial vertical movement of the container 12, and therefore removal of the container 12 from the spindle 16. As a result, the vertical lock 72 may selectively maintain the system in a vertically locked state. In optional embodiments, the vertical lock may include a hitch pin disposed through the spindle 16 to prevent movement of the container 12 past the vertical lock and hitch pin. In one embodiment, the vertical lock 72 includes a plurality of bearings disposed therein operable to selectively engage the reduced diameter section of the lock post 74 to retain the vertical lock 72 on the lock post 74.

In one embodiment, the container 12 includes a first side 46, a second side 48, front surface 50, and a rear surface 52. A container length 58 is defined between the first 46 and second side 48, while a container depth 60 is defined between the front 50 and rear face 52. When the container 12 is mounted in the vehicle and secured to the mounting bracket 14, the first side 46 is positioned at the proximal end 19 of the container system 10, and the second side 48 is positioned at the distal end 21 of the container system 10. Similarly, the front face 50 faces a front part of the vehicle, and the rear face 52 faces a rear part of the vehicle. The container 12 also includes a top surface 54 facing a top portion of the vehicle, and a bottom surface 56 facing the vehicle floor. In one embodiment, the length 58 of the container 12 is configured to correspond to an overall lateral width (e.g., length 62) of the mounting bracket 14. In another embodiment, the depth 60 of the container 12 is configured to correspond to the depth 64 of the first portion 18 of the mounting bracket 14.

Although containers of various dimensions may be used, in optional embodiments, the container dimensions are substantially equal to some of the mounting bracket dimensions. Container length 58 is substantially equal to the length 62 of the second portion 20, and container depth 60 is substantially equal to the depth 64 of the first portion 18.

Figure 10:
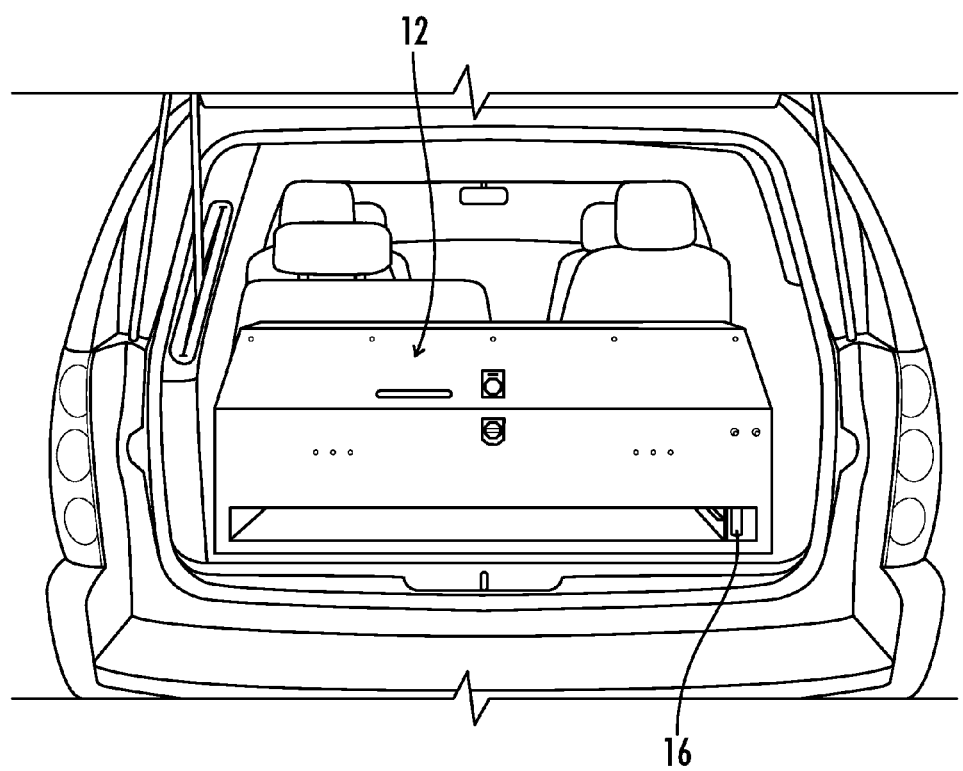
FIG. 10 is a rear perspective view of a container system mounted and secured in an SUV.
Figure 11:
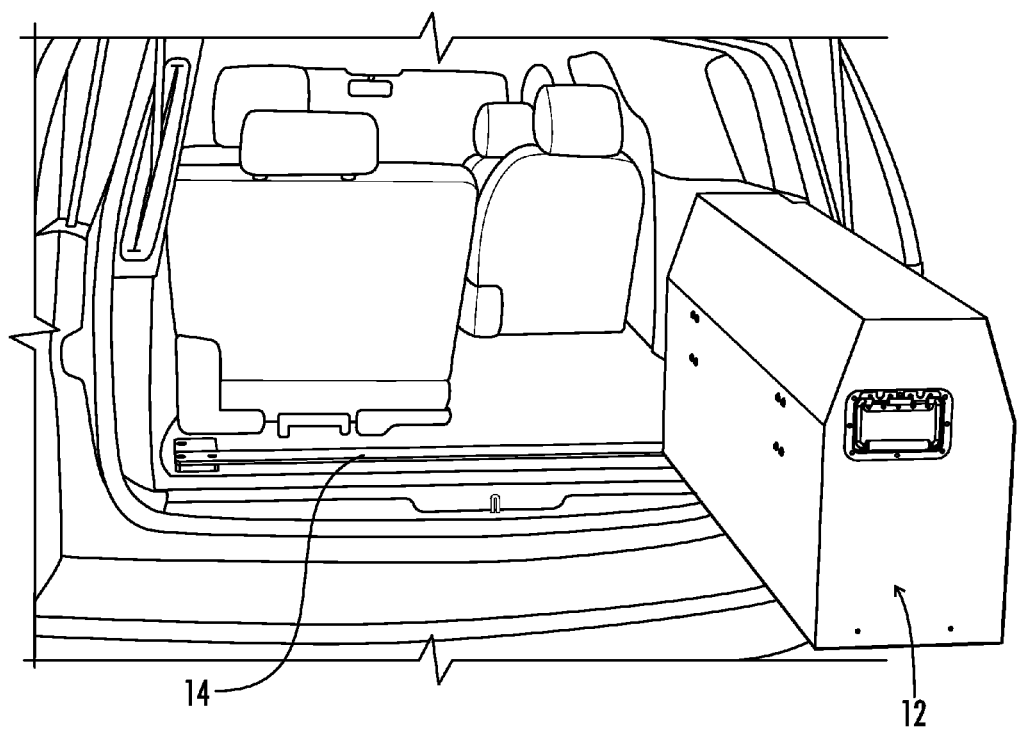
FIG. 11 is a rear perspective view of a container system mounted in an SUV in an open position.

Referring to FIGS. 10 and 11, a container system is shown properly mounted in an SUV. The container 12 is a secured or closed position in FIG. 10 and in an open or unsecured position in FIG. 11. In one embodiment, the spindle 16 and vertical lock 72 are internal to the container 12 when the container is installed or mounted on the spindle 16, providing improved theft resistance.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful Container System and Mount, it is not intended that such references be construed as limitations upon the scope of this invention except as set forth in the following claims.

What is claimed is:

1. A container system configured to extend laterally with respect to a vehicle, the container system is mounted to and secured in the vehicle, said container system comprising:
   a mounting bracket comprising:
      a first portion configured to mount to a floor surface of the vehicle, the first portion extending primarily longitudinally with respect to the vehicle at a proximal end of the mounting bracket, and
      a second portion configured to mount to the floor surface of the vehicle, the second portion extending laterally from the first portion with respect to the vehicle at a distal end of the mounting bracket, wherein the first portion extends longitudinally from the second portion;
   a spindle configured to extend vertically from the first portion of the mounting bracket, the spindle having a base end configured to attach to the mounting bracket and a free end opposite the base end; and a container configured to pivotally attach to the spindle, wherein a distal end of the container extends substantially to the distal end of the mounting bracket when the container system is mounted to and secured in the vehicle.

2. The container system of claim 1, further comprising a shoulder stop extending vertically from at least a portion of the second portion of the mounting bracket;
wherein the shoulder stop is configured to prevent the container from rotating toward a front of the vehicle beyond a predetermined position when the container system is mounted to the vehicle.

3. The container system of claim 2, further comprising:
a catch disposed at the distal end of the container; and
a latch attached to the shoulder stop and configured to engage the catch of the container such that when the latch engages the catch of the container, the container is secured to the mounting bracket at the distal end of the container.

4. The container system of claim 1, wherein:
the spindle has a spindle diameter; and
the container system further comprises a vertical lock having a lock diameter greater than the spindle diameter and an inner diameter of a pivot mount of the container, the vertical lock configured to be positioned onto the free end of the spindle when the container is pivotally mounted to the spindle, thereby preventing removal of the container from the spindle when the vertical lock is attached.

5. The container system of claim 1, further comprising a first fastener configured to attach the first portion of the mounting bracket to the vehicle floor to prevent substantial horizontal movement of the spindle when the container is mounted in the vehicle and in an open position, wherein a depth of the first portion of the mounting bracket is substantially the same as a depth of the container.

6. The container system of claim 1, wherein the second portion of the mounting bracket further comprises a wedge at a top surface of the second portion of the mounting bracket, wherein the wedge extends longitudinally with respect to the vehicle when the mounting bracket is mounted to the vehicle, and the wedge is configured to engage a bottom surface of the container when the container is mounted in and secured to the vehicle to provide a distal portion of the container with a supporting vertical force and a frictional force opposing rotation of the container about the spindle.

7. The container system of claim 6, wherein the wedge is formed from a deformable material such that the wedge is compressively deformed when the bottom face of the container engages the wedge.

8. The container system of claim 2, wherein the shoulder stop comprises a resilient bumper plate configured to engage a front face of the container when the container system is mounted to and secured in the vehicle, thereby dampening vibrations transferred to and from the container.

9. A mounting bracket system configured to support a container of a container system, said mounting bracket system comprising:
a mounting bracket having:
a first portion configured to mount to a floor surface of a vehicle, the first portion extending longitudinally with respect to the vehicle at a proximal end of the mounting bracket, and
a second portion configured to mount to the floor surface of the vehicle, the second portion extending laterally from the first portion with respect to the vehicle toward a distal end of the mounting bracket;
a spindle configured to extend vertically from the first portion of the mounting bracket, the spindle having a base end configured to attach to the mounting bracket and a free end opposite the base end; and
a shoulder stop extending vertically from at least a portion of the second portion of the mounting bracket, wherein the shoulder stop is configured to engage the container to prevent the container from rotating beyond a predetermined position when the mounting bracket system is mounted in the vehicle and the container is supported by the spindle.

10. The mounting bracket system of claim 9, further comprising a latch attached to the shoulder stop and configured to engage a catch disposed at a distal end of the container such that the container is secured to the mounting bracket at the distal end of the container when the latch engages the catch of the container.

11. The mounting bracket system of claim 9, further comprising a first fastener configured to attach the first portion of the mounting bracket to the vehicle floor such that the mounting bracket prevents substantial horizontal movement of the spindle when the container is supported by the spindle in an open position, wherein a depth of the first portion of the mounting bracket is substantially the same as a depth of the container.

12. The mounting bracket system of claim 9, wherein the second portion of the mounting bracket further comprises a wedge at a top surface of the second portion of the mounting bracket, wherein the wedge extends longitudinally with respect to the vehicle when the mounting bracket is mounted to the vehicle, and the wedge is configured to engage a bottom face of the container when the container is secured to the mounting bracket to provide a distal portion of the container with a supporting vertical force and a frictional force opposing rotation of the container about the spindle.

13. The mounting bracket system of claim 12, wherein the wedge is formed from a deformable material such that the wedge is compressively deformed when the bottom face of the container engages the wedge.

14. The mounting bracket system of claim 9, wherein the shoulder stop comprises a resilient bumper plate configured to engage a front face of the container when the container is secured to the mounting bracket to dampen vibrations between the container and mounting bracket when the container is secured to the mounting bracket.

15. The mounting bracket system of claim 9, wherein:
the spindle has a spindle diameter; and
the mounting bracket system further comprises a vertical lock having a lock diameter greater than the spindle diameter and an inner diameter of a pivot mount of the container, the vertical lock configured to be positioned onto the free end of the spindle when the container is pivotally mounted to the spindle, thereby preventing removal of the container from the spindle when the vertical lock is attached.

* * * * *